United States Patent [19]
Huckins

[11] Patent Number: 5,612,898
[45] Date of Patent: Mar. 18, 1997

[54] COMMUNICATION PROTOCOL EVENT LOGGING SYSTEM FOR USE WITH VARIOUS PROTOCOLS

[75] Inventor: Jeff Huckins, Aloha, Oreg.

[73] Assignee: Intel Corporation, Santa Clara, Calif.

[21] Appl. No.: 385,805

[22] Filed: Feb. 9, 1995

[51] Int. Cl.⁶ ................................................ G06F 17/00
[52] U.S. Cl. ...................................................... 364/514 R
[58] Field of Search .................... 364/514 R, DIG. 1, 364/262.4, 280.4, 284.4; 395/500, 700, 183.03, 183.04, 200.11, 200.14

[56] References Cited

U.S. PATENT DOCUMENTS

| | | | |
|---|---|---|---|
| 5,375,241 | 12/1994 | Walsh | 395/700 |
| 5,408,618 | 4/1995 | Aho et al. | 395/200.11 |
| 5,515,504 | 5/1996 | Le Van Sun | 395/183.04 |
| 5,561,800 | 10/1996 | Sabatella | 395/700 |

*Primary Examiner*—Ellis B. Ramirez
*Attorney, Agent, or Firm*—Blakely, Sokoloff, Taylor & Zafman

[57] ABSTRACT

An apparatus and method for monitoring and debugging interface protocols in a computer system is disclosed. A software based communication protocol logging system (CPLS) provides a single event logging interface for multiple communication protocols. A client logging interface of the CPLS is used by client components to periodically transfer log data or messages to a log file thereby providing a debug tracing log of the execution of the client component. The CPLS comprises software for supporting the calls that are members of the client logging interface. In general, the CPLS provides a generic event logging interface for one or more client components thereby insulating client components from data and methods particular to a specific communication protocol. The protocol specific information and functions are maintained within independent protocol specific event handlers. The present invention improves on the prior art systems by creating an abstraction layer (i.e. CPLS) between the client components and the protocol specific event handlers. Thus, when the present invention services a request by a client component to output log data, a generic interface between the client component and the CPLS can be used to subsequently trigger the execution of the appropriate protocol specific event handler.

18 Claims, 10 Drawing Sheets

| | | |
|---|---|---|
| A | CPLOpen | OPEN A PROTOCOL LOG OBJECT OF THE TYPE SPECIFIED AND RETURN A HANDLE TO IDENTIFY THE NEWLY OPENED STREAM |
| B | CPLOutputDebug | OUTPUT A DEBUG STRING TO AN OPEN CPLS STREAM |
| C | CPLOutputAscii | OUTPUT ASCII REPRESENTATION OF A DECODED PDU |
| D | CProtocolLog::OutputAscii() | CALL A VIRTUAL PROTOCOL EVENT DECODING HANDLER |
| E | CPLOutput | OUTPUT ENCODED PDU IN HEX FORMAT |

FIG. 3

COMMUNICATION PROTOCOL EVENT LOGGING SYSTEM FOR USE WITH VARIOUS PROTOCOLS

BACKGROUND OF THE INVENTION

1. Field of the Invention

The field of the present invention is computer systems supporting various communication protocols. Specifically, the present invention relates to a communication protocol event logging system for use with various protocols.

2. Background of the Invention

Computer systems, particularly small computer systems or personal computer systems, often support a number of external interfaces to peripheral devices or communication networks. Each of these external interfaces has a corresponding interface protocol that defines the control and data interchange between the host computer system and a destination peripheral device or networked data transceiver. The interface protocol also defines the manner by which communication events are handled by the particular interface. These interface events can include, for example, character input, character output, data block input, or data block output events.

One problem with prior art computer systems is that many different interface protocols may be supported by a wide variety of different computer system platforms. Because of this diversity, it is difficult to configure a computer system for general operation in an unknown communication environment. One prior art system attempting to address this problem is the Windows™ operating system developed by Microsoft™ Corporation of Redmond, Wash. The Windows™ operating system, among others, provides a dynamic link library (DLL) capability with which interface protocol components within shared libraries can be dynamically linked during runtime operation of the computer system. The DLL structure allows a computer system to be dynamically configurable without rebuilding or relinking any other software components.

Because interface protocols define specific data exchanges between two systems, it is important to provide a mechanism for monitoring, logging, and debugging particular interface protocol implementations. Using prior art systems, it is necessary to develop specific interface protocol debugging tools for each different type of interface protocol. In other prior art implementations, expensive interface protocol analyzer tools are used to monitor and debug particular protocol data transactions. In general, prior art systems have failed to provide a generic framework for interface protocol monitoring and debugging without significantly degrading system performance.

Thus, a general-purpose interface protocol monitoring and debugging system is required.

SUMMARY AND OBJECTS OF THE INVENTION

The present invention is an apparatus and method for providing a general-purpose interface protocol event monitoring and debugging in a computer system. The present invention is a software based communication protocol logging system (CPLS) providing a single event logging interface for multiple communication protocols. The software of the preferred embodiment is executed by a computer system and over computer networks having various internal architectures. The present invention operates with a communication protocol client component. The client component represents any of a number of existing prior art application programs, operating system modules, or other existing software packages supporting one or more communication protocols. It is advantageous to provide a logging or debug capability for monitoring the operation of the client component to make sure that the client component operates in compliance with the protocol specification for the particular protocol being used. Thus, the present invention provides a client logging interface with which client components may periodically transfer log data or messages on a log file to provide a debug tracing log of the execution of the client component.

The client logging interface is supported by the communication protocol logging system (CPLS) of the present invention. The CPLS comprises software for supporting the calls that are members of the client logging interface. In general, the CPLS provides a generic event logging interface for one or more client components thereby insulating client components from data and methods particular to a specific communication protocol. The protocol specific information and functions are maintained within independent protocol specific event handlers. The present invention improves on the prior art systems by creating an abstraction layer (i.e. CPLS) between the client components and the protocol specific event handlers. Thus, when the present invention services a request by a client component to output log data, a generic interface between the client component and the CPLS can be used to subsequently trigger the execution of the appropriate protocol specific event handler.

It is, therefore, an object of the present invention that the general-purpose interface protocol event monitoring system of the present invention can provide a dynamically configurable means for monitoring various interface protocols. It is a further advantage of the present invention to provide a general purpose interface protocol event monitoring system in which particular categories of events can be switchably selected during runtime operation of the system. It is a further advantage of the present invention to provide a means for variably outputting logged data in various selectable display formats. It is a further advantage of the present invention that the interface protocol event logging and debugging process is performed without substantially degrading computer system performance. It is a further advantage of the present invention that the interface protocol event logging and debugging process includes an asynchronous mode for asynchronously outputting log data to a log file. It is a further advantage of the present invention that the interface protocol event logging and debugging process provides a means for interleaving the output of log data for several clients onto a single log data output data stream.

These and other advantages of the present invention will become apparent as illustrated in the figures and described in the following detailed description of the preferred embodiment.

BRIEF DESCRIPTION OF THE DRAWINGS

FIG. 3 illustrates the client logging interface calls.

DETAILED DESCRIPTION OF THE PREFERRED EMBODIMENT

The present invention is an apparatus and method for general-purpose interface protocol monitoring, logging, and debugging in a computer system supporting various interface protocols. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, and interfaces have not been shown or described in detail in order not to unnecessarily obscure the present invention.

Figure 1:
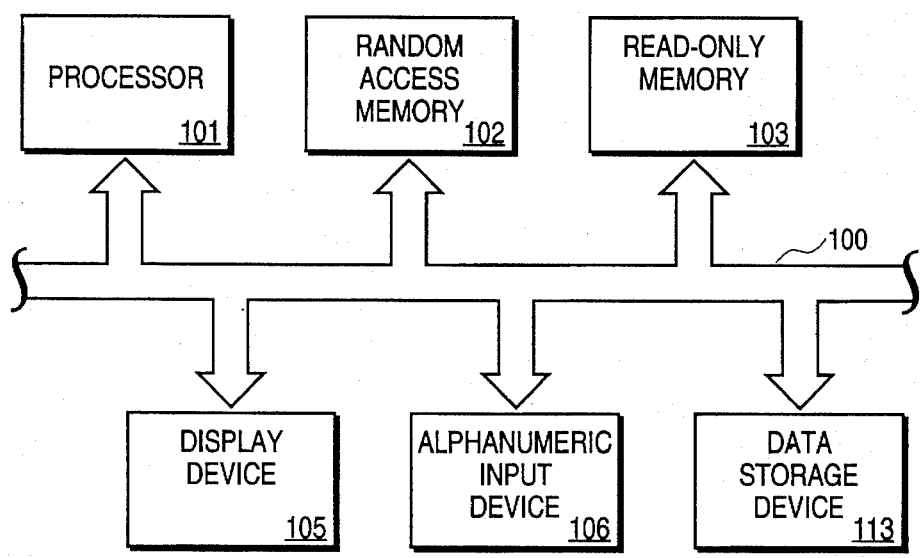
FIG. 1 illustrates a typical computer system architecture in which the present invention operates.

Referring now to FIG. 1, a typical computer system architecture in which the present invention operates is illustrated. The preferred embodiment of the present invention is implemented on an IBM™ PC computer manufactured by IBM™ Corporation of Armonk, N.Y. It will be apparent to those of ordinary skill in the art, however, that alternative computer system architectures may be employed. In general, such computer systems, as illustrated by FIG. 1, comprise a bus 100 for communicating information, a processor 101 coupled with the bus 100 for processing information, a random-access memory 102 coupled with bus 100 for storing information and instructions for the processor 101, a read-only memory 103 coupled with bus 100 for storing static information and instructions for the processor 101, a display device 105 coupled with the bus 100 for displaying information for a computer user, an alphanumeric input device 106 coupled with the bus 100 for communicating information and command selections to the processor 101, and a data storage device 113, such as a magnetic disk and disk drive, coupled with the bus 100 for storing information and instructions. Processor 101 may be any of a wide variety of general-purpose processors or microprocessors, such as the i486™ brand microprocessor manufactured by Intel Corporation of Santa Clara, Calif. It will be apparent to those of ordinary skill in the art, however, that other varieties of processors may be used in a particular computer system. Display device 105 may be a liquid crystal device, a cathode ray tube (CRT), or other suitable display device. Data storage device 113 may be a conventional hard disk drive, floppy disk drive, or other magnetic or optical data storage medium. In general, processor 101 retrieves processing instructions and data from data storage device 113 and downloads this information into random access memory 102 for execution. Processor 101, then, executes an instruction stream from random access memory 102 or read-only memory 103. Command selections and information input at alphanumeric input device 106 are used to direct the flow of instructions executed by processor 101. The results of this processing execution are then displayed on display device 105.

The preferred embodiment of the present invention is a software-based general-purpose interface protocol event logging and debugging system. In the preferred embodiment, this protocol monitoring system is comprised of software and an interface architecture resident in and executed from random access memory 102. It will be apparent to those of ordinary skill in the art, however, that alternative embodiments of the same architecture may equivalently be implemented.

Figure 2:
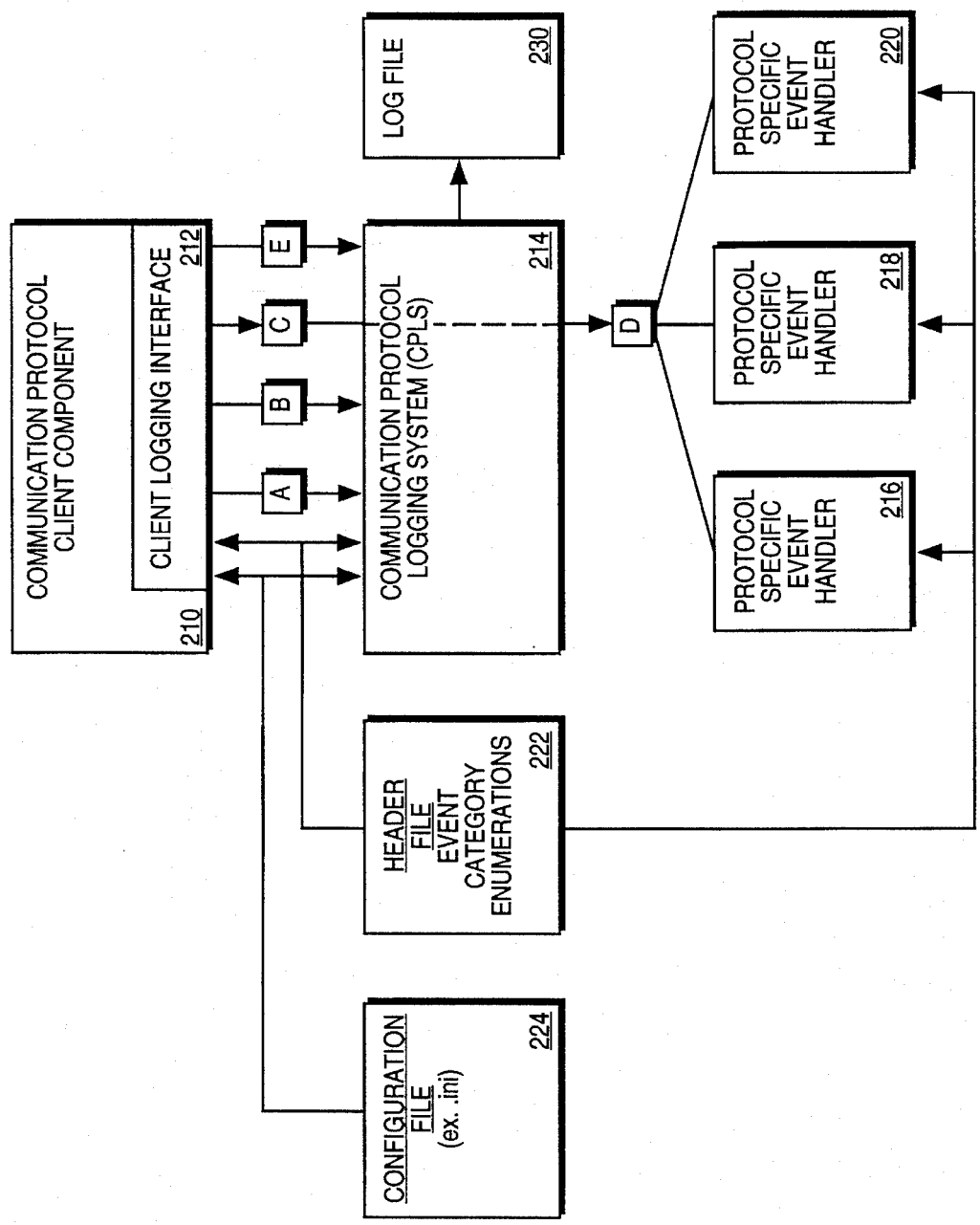
FIG. 2 illustrates the architecture and interfaces of the present invention.

Referring now to FIG. 2, the architecture of the system of the present invention is illustrated. The present invention is a software based communication protocol logging system (CPLS) providing a single event logging interface for multiple communication protocols. The software of the preferred embodiment is executed by a computer system such as the one illustrated in FIG. 1; however, the present invention may equivalently be executed by computer systems and over computer networks having various internal architectures.

Referring to FIG. 2, the system of the present invention comprises a communication protocol client component 210. Client component 210 represents any of a number of existing prior art application programs, operating system modules, or other existing software packages supporting one or more communication protocols. It is often the case that these client components 210 are configurable for one of a number of supported communication protocols. For example, TCP/IP and AppleTalk are two examples of communication protocols that may be supported by a client component 210. It is advantageous to provide a logging or debug capability for monitoring the operation of client component 210 to make sure that client component 210 operates in compliance with the protocol specification for the particular protocol being used. Thus, the present invention provides a client logging interface 212 with which client component 210 may periodically log data or messages on a log file 230 to provide a debug tracing log of the execution of client component 210.

Client logging interface 212 is supported by communication protocol logging system (CPLS) 214 as illustrated in FIG. 2. CPLS 214 comprises software for supporting the calls that are members of client logging interface 212. Each of these calls provided in the logging system of the preferred embodiment are described in detail below. It will be apparent to one of ordinary skill in the art, however, that other calls may also be added to client logging interface 212 without departing from the scope of the present invention. In general, CPLS 214 provides a generic event logging interface for client component 210 thereby insulating client component 210 from data and methods particular to a specific communication protocol. The protocol specific information and functions are maintained within protocol specific event handlers 216, 218 and 220 as shown in FIG. 2.

In the preferred embodiment of the present invention, CPLS 214 is implemented as a dynamic link library (DLL) routine as supported by shared library operating systems such as Windows™ developed by Microsoft Corporation of Redmond Wash. Alternative implementations of the present invention may use network link modules (NLM) or other forms of well known methods for dynamically linking or run time binding of software modules. In general CPLS 214 accepts event logging requests from client component 210 through client logging interface 212 and creates a logging data stream to a log file 230 where time tagged event log records are stored.

As illustrated in FIG. 2, client logging interface 212 is comprised of interface calls A, B, C, D and E in the preferred embodiment. Each of these calls are identified and explained in the table illustrated in FIG. 3.

As shown in FIG. 3, interface A corresponds to a CPLOpen call which is used by client component 210 to open a protocol log object of a specified type corresponding to a data stream for logging event dam in log file 230. Processing for servicing this call within CPLS 214 is described below in connection with FIG. 7. Because the CPLOpen call does not require protocol specific processing, the servicing of this call can be accomplished completely within communication protocol logging system 214.

The next interface B is the CPLOutputDebug call which outputs a known debug stream on an open CPLS logging data stream to log file 230. The CPLOutputDebug call is typically used for outputting a trace message to log file 230. The processing performed by the CPLOutputDebug call is described in more detail below in connection with FIG. 8. Again, the CPLOutputDebug call does not require access to a protocol specific handler; therefore, processing for this call is also accomplished completely within CPLS 214.

Call C in the preferred embodiment is the CPLOutputAscii call. The CPLOutputAscii call is used to output the ASCII representation of a decoded protocol data unit (PDU). The present invention provides a means by which client component 210 may log a set of information retained within a PDU as part of an event logging request.

Figure 4:
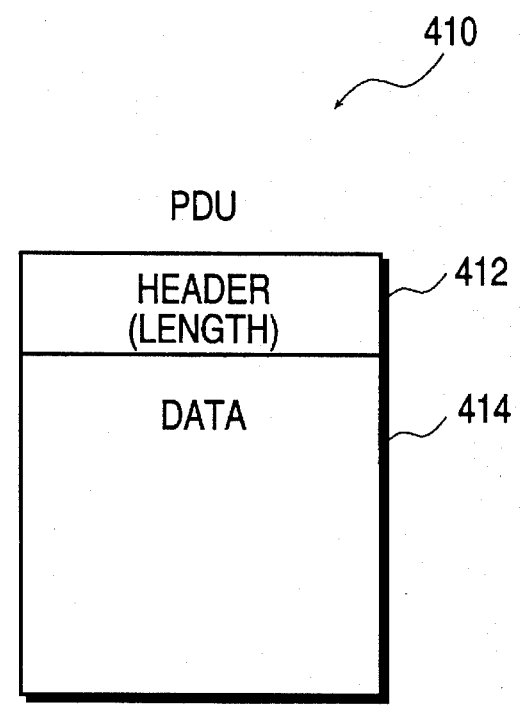
FIG. 4 illustrates the basic structure of a protocol data unit.

Referring now to FIG. 4, a block diagram illustrates the content a PDU 410 in the preferred embodiment. In its simplest form, a PDU is comprised of a header portion 412, which typically includes a length of the subsequent data portion 414 retained within PDU 410. The data stored within the data portion 414 of PDU 410 can be any useful event logging information related to a particular communication protocol. Because the content of a PDU is protocol specific, it is necessary to employ a protocol specific event handler to decode and display the data within data portion 414. Prior art systems required that client component 210 maintain the means for decoding protocol specific logging information within client component 210. This design however creates problems when many different communication protocols must be supported. These prior art systems were prone to many configuration management problems because of the need to support many communication protocol specific interfaces to other logging software.

The present invention improves these prior art systems by creating an abstraction layer (i.e. CPLS 214) between the client component 210 and the protocol specific event handlers 216, 218, and 220. Thus, when the present invention services a CPLOutputAscii call to log a decoded PDU as shown in FIG. 2, a generic interface C between client component 210 and CPLS 214 can be used to subsequently trigger the appropriate protocol specific event handler through call D. Call D is called through CPLS 214 using a derived protocol specific handler as derived from an abstract genetic event logging request. This process is described in more detail in connection with FIG. 9.

Referring again to FIG. 2, interface E corresponds to the CPLOutput call which is used to output an encoded PDU to log file 230 in a hex or binary format. Again, because the output of the content of a PDU in a hex or binary format does not require a protocol specific event handler, this call is handled completely within CPLS 214 and does not require a derived protocol specific method.

Figure 5:
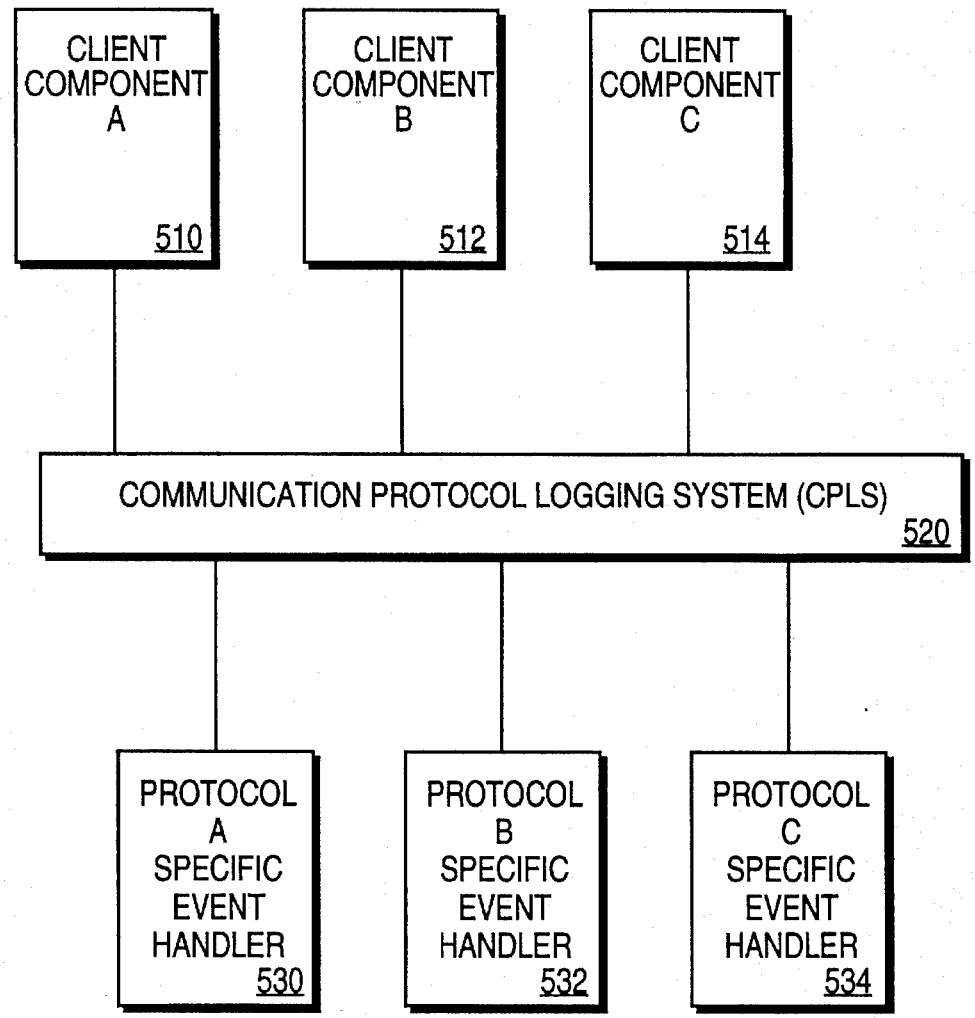
FIG. 5 illustrates the architecture of the system of the present invention for multiple client components.

Referring to FIG. 5, the present invention is shown with multiple client components and multiple protocol specific event handlers. In this situation, CPLS 520 is coupled to a plurality of client components 510, 512 and 514. Each of these client components comprise software components including one or more communication protocols. Because it is inconvenient to design communication protocol specific structures into these client components, the present invention provides a means for separating out protocol specific log processing logic into protocol specific event handlers 530, 532 and 534. Using CPLS 520, request for logging from client components 510, 512 and 514 can be serviced by CPLS 520 or a corresponding protocol specific event handler when event logging PDUs must be decoded by a protocol specific event handler. Thus, CPLS 520 supports multiple clients on one side and multiple protocol specific event handlers on the other side. The system architecture described herein supports these multiple client configurations.

Figure 6:
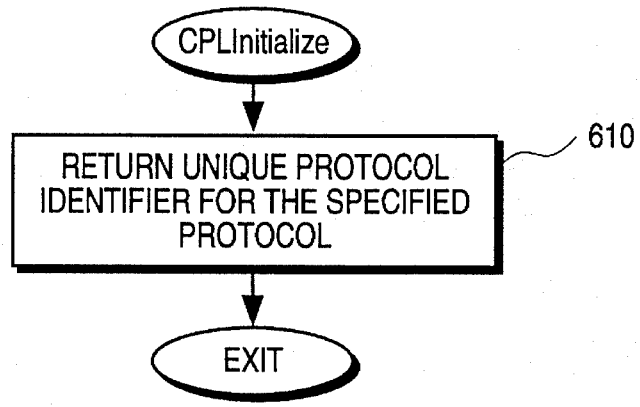
FIGS. 6–11 are flowcharts illustrating the processing logic of the present invention.

Referring now to FIGS. 6 through 11 and FIG. 2, flow charts are used to illustrate the processing performed by processing logic within CPLS 214 for servicing each of the calls made by client component 210 through client logging interface 212. Referring to FIG. 6, the first of these calls, not shown in FIG. 2, is the CPLInitialize call. This call is used by client component 210 to register a unique protocol identifier corresponding to a specified particular protocol. In processing this call, the CPLInitialize returns a unique protocol identifier corresponding to the specified protocol (processing block 610). Processing then exits for the CPLInitialize routine.

Figure 7:
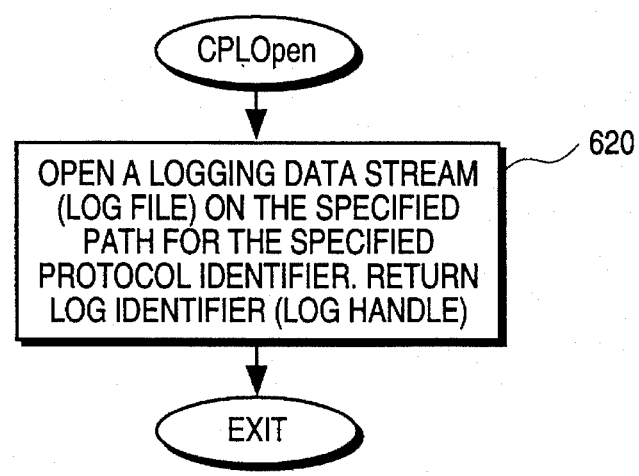

Referring now to FIG. 7, the processing performed for a CPLOpen call is illustrated. As described above, the CPLOpen call is used to open a data stream to a log file 230 for storage of event logging data. In response to this call, the CPLOpen routine opens a logging data stream on the log file 230 on the specified path for the specified protocol identifier. The CPLOpen routine returns a log identifier or log handler (processing block 620). Processing CPLOpen call then returns through the exit bubble illustrated in FIG. 7.

Figure 8:
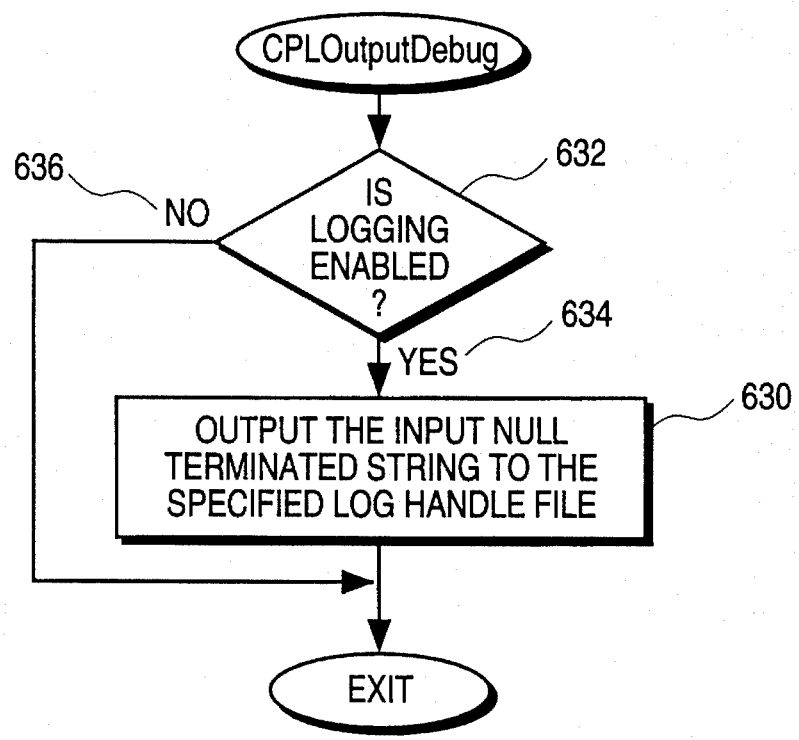

Referring now to FIG. 8, the processing performed in response to a call to the CPLOutputDebug call is illustrated. The present invention provides a means for globally disabling the logging of event data through CPLS 214. Using a configuration file 224 as illustrated in FIG. 2, a global flag is provided and configured to either enable or disable the logging functions of the present invention. If this flag is enabled, CPLS 214 outputs a specified null terminated input stream to the specified log handle file (processing block 630). The specified stream corresponds to a client component defined trace string for a particular event. If logging is disabled, processing path 636 illustrated in FIG. 8 is taken and processing for the CPLOutputDebug routine terminates through the exit bubble illustrated in FIG. 8.

Figure 9:
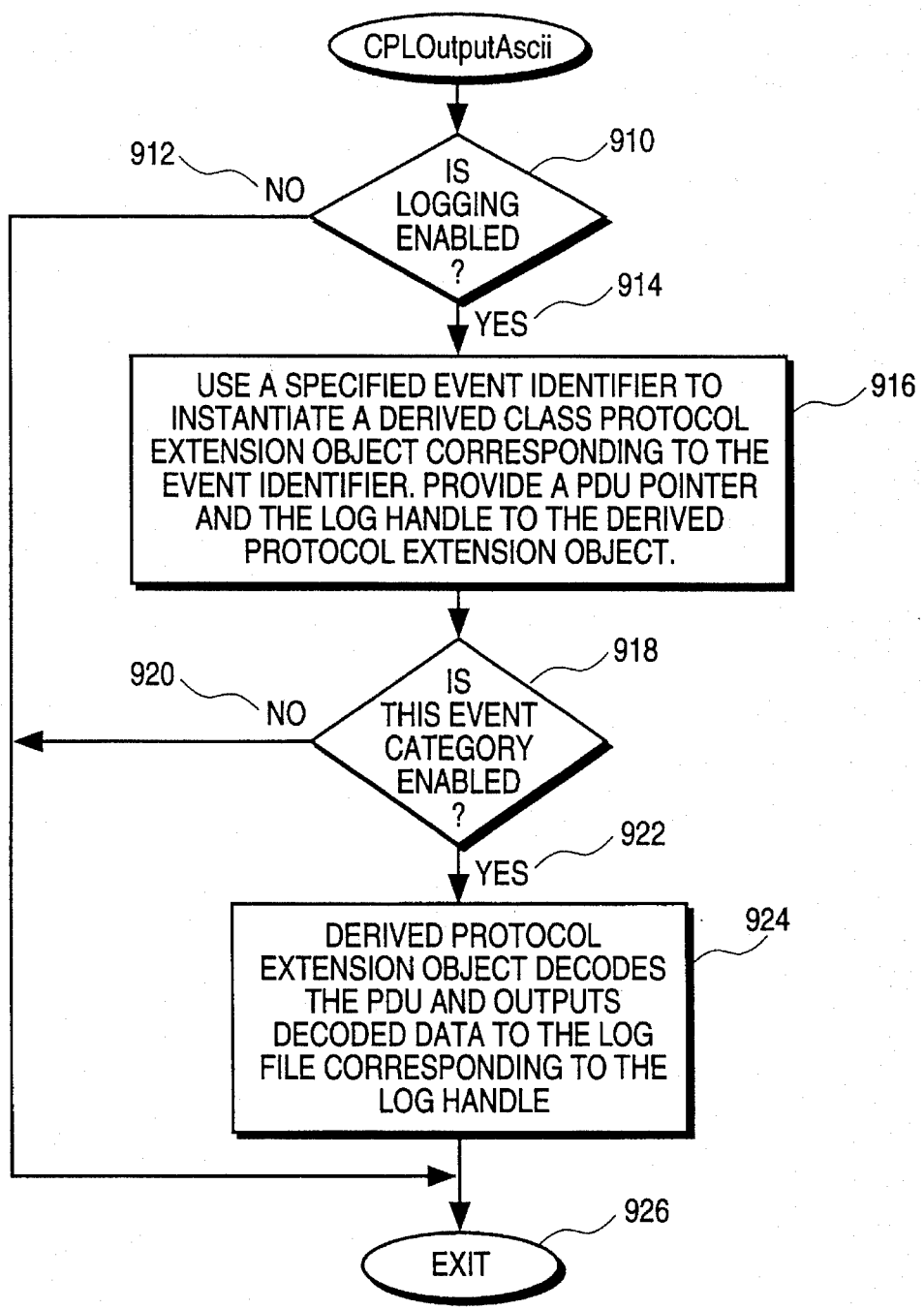

Referring now to FIG. 9, the processing performed in response to a CPLOutputAscii call is illustrated. This call is made if client component 210 desires to output a protocol specific PDU to log file 230. In this case, the CPLOutputAscii routine within CPLS 214 must employ a derived protocol specific event handler. But first, the logging enable flag is checked in decision block 910. If logging is disabled, processing path 912 is taken and processing terminates through exit bubble 926. If however logging is enabled, processing path 914 is taken to processing block 916. In this case, the derived class protocol specific event handler is instantiated using a specified event identifier provided as an input parameter by client component 210. Referring again to FIG. 2, a header file 222 is used to globally maintain event category enumerations for use by client component 210 and each of the protocol specific event handlers 216, 218 and 220. These event category enumerations or event identifiers correspond to distinct ones of the protocol specific event handlers. By providing the appropriate event identifier, client component 210 can produce an instantiation of the appropriate derived class protocol specific event handler object in processing block 916 illustrated in FIG. 9. The PDU pointer and the log handle provided by the client component 210 are passed on to the newly instantiated derived class protocol specific event handler in processing block 916.

The present invention also provides a means for inhibiting the event logging operation on a per category basis. Categories are defined as sets of events within a particular specific protocol. Given the event identifier, if the particular event category is enabled, processing path 922 illustrated in FIG. 9 is taken to processing block 924. In this case, the instantiated derived class protocol specific event handler decodes the data within the specified PDU and outputs the decoded data to the log file corresponding to the input log handle (processing block 924). Processing then terminates through exit bubble 926. If the corresponding event category is disabled, processing path 920 is taken directly to exit bubble 926 where processing for the CPLOutputAscii routine terminates. Note that the design of the present invention does not require that the client component 210 directly call the desired protocol specific event handler. In this manner, the client component 210 is isolated from protocol specific event handler details.

Figure 10:
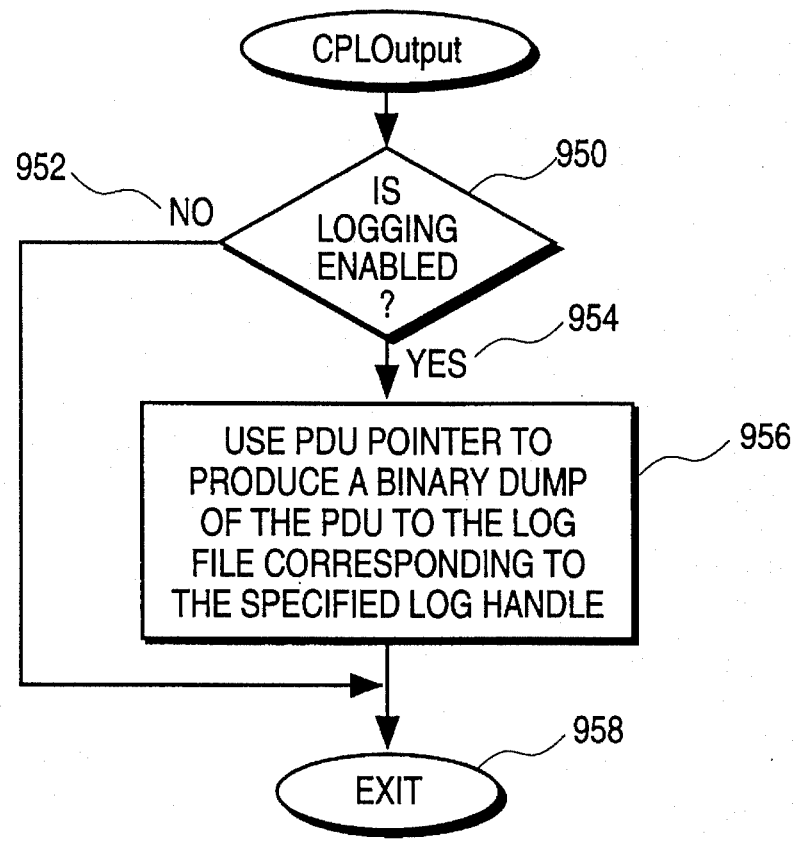

Referring now to FIG. 10, the processing performed in response to the CPLOutput call is illustrated. If logging is enabled, processing path 954 is taken to processing block 956. In this case, an input PDU pointer is used to access the data within a desired PDU. For this call, the content of the PDU is decoded into a hex or binary format and output to the log file corresponding to the specified log handle (processing block 956). Because the decoding of the content of the PDU in a binary or hex format does not require protocol specific event handler processing, no use of derived class objects is required in this routine. If the logging function is disabled, processing path 952 is taken to exit bubble 958 where processing for the CPLOutput call is terminated.

Figure 11:
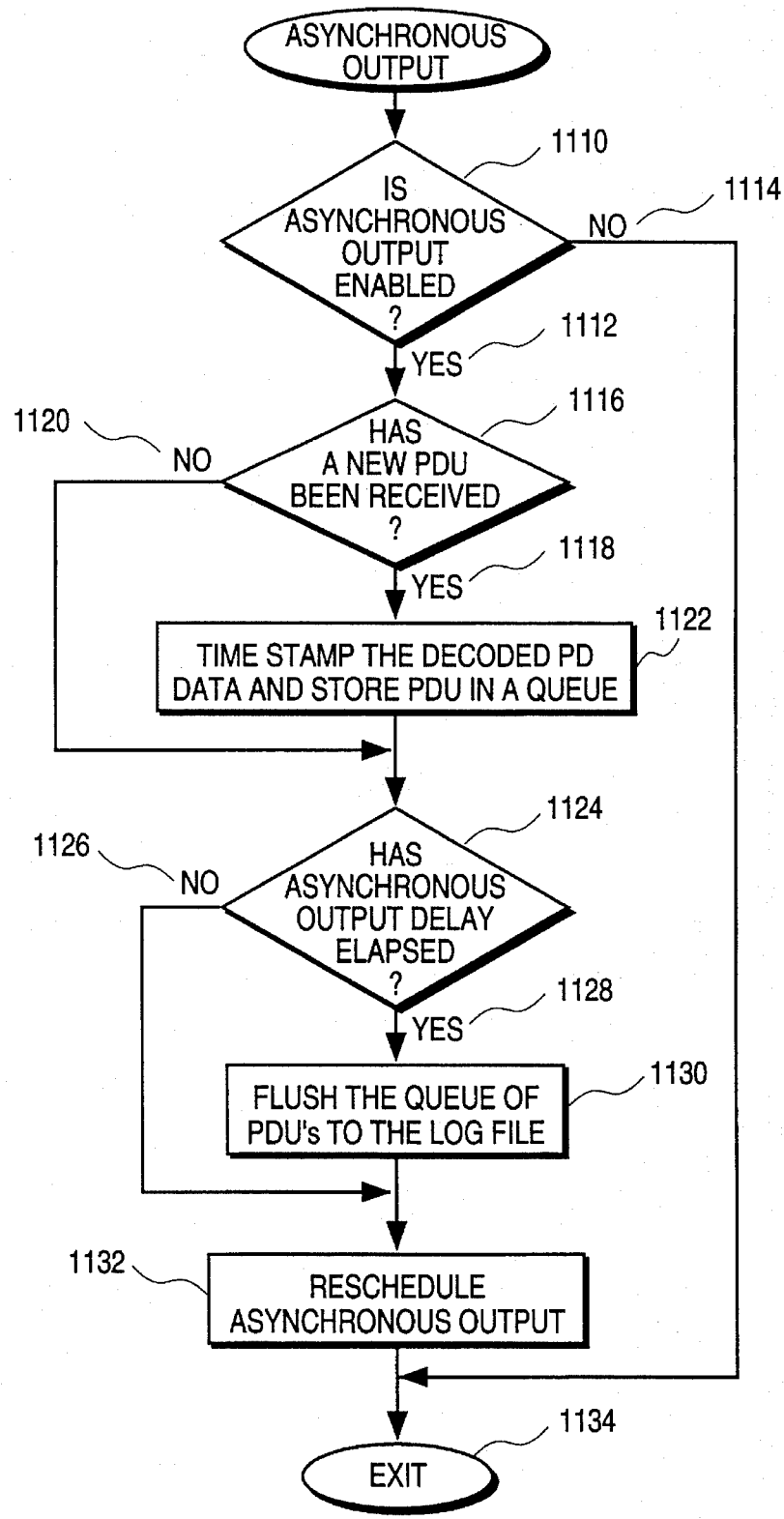

Referring now to FIG. 11, processing performed within CPLS 214 for the asynchronous output that log data is illustrated. In some situations, the decoding and output of PDU log data to log file 230 may inappropriately degrade the system performance. In these cases, it may not be desirable to immediately output log data on each call to a particular output routine. The present invention therefore provides a means for asynchronous output of event log data. In other words, rather than immediately performing the decoding and output of event log data during the call to a particular event log data output routine, asynchronous mode allows event log data to be retained in an event queue and then periodically transferred in groups after a preset delay. The delay is created in the preferred embodiment using a conventional system timer callback function. Using this conventional operating system feature, a timer callback routine is scheduled for execution at a specified time or after a specified delay. The delay time interval and the number of log events per group to output from the event queue can be specified in the preferred embodiment. In asynchronous mode, a copy of the PDU is made, time stamped, and placed in the event queue for processing after the system timer callback. The system timer callback is then scheduled for execution after a specified delay. When the system timer callback occurs, the specified number of PDUs are retrieved from the event queue and output to the log file. The system timer callback function is then rescheduled for another execution cycle after the specified delay. This process of the preferred embodiment is described in more detail in FIG. 11.

Referring now to FIG. 11, if the asynchronous output of log data is enabled, processing path 1112 is taken to decision block 1116. If a new PDU has been received during this cycle, processing 1118 is taken to processing block 1122. In this case, the newly received PDU is time stamped and stored in an event queue (processing block 1122). If an asynchronous output delay timer (i.e. system timer callback in the preferred embodiment) has elapsed, processing path 1128 is taken to processing block 1130. In this case, the event queue is flushed of previously stored PDUs and the decoded PDU information is transferred to the log file 230. Alternatively, a pre-determined number of PDUs are retrieved from the event queue, decoded, and transferred to the log file 230. The asynchronous output module is then rescheduled for subsequent execution at a predefined time in processing block 1132. Asynchronous output processing then terminates through exit bubble 1134. Referring again to decision block 1124, if the asynchronous output delay timer has not elapsed, processing path 1126 is taken to processing block 1132 and the event queue is not flushed during the cycle. Referring again to decision block 1116, if a new PDU has not been received during this cycle (processing path 1120), the PDU processing block 1122 is not performed during this cycle. Referring again to decision block 1110, if asynchronous output mode is disabled, processing path 1114 is taken to exit bubble 1134 where asynchronous output processing terminates.

In asynchronous mode, multiple CPLS clients, such as the configuration illustrated in FIG. 5, may elect to interleave their individual log output data with the log output data of other CPLS clients on the same output stream. In this manner, the relative timing or synchronization of events with respect to each of the CPLS clients can be ascertained. This synchronization information improves the diagnostic capabilities of the overall system.

The present invention is advantageously modular to the extent that there is common code base from which all protocols can be built without the need to consider protocols specific details. Using a prior art DLL capability, the present invention supports a wide variety of varying communication protocols by simply including or omitting the corresponding DLL at the time the system is initialized. If no protocol specific event handler modules are installed, the present invention still provides a default capability for decoding and displaying event log information in a binary or hex format. Using the present invention, the various available communication protocols can be easily integrated into an existing architecture with no loss of event logging capability.

Thus, an apparatus and method for the general-purpose interface protocol event logging and debugging in a computer system is disclosed. Although the present invention is described herein with reference to a specific preferred embodiment, many modifications and variations therein will readily occur to those of ordinary skill in the art. Accordingly, all such variations and modifications are included within the intended scope of the present invention as defined by the following claims.

We claim:

1. A computer software implemented protocol event logging system comprising:

means for receiving an event logging request from a client component operating under a particular protocol;

means for determining if said event logging request requires protocol specific processing;

means for invoking a protocol specific handler corresponding to said particular protocol to process said request if said request requires protocol specific processing; and means for processing said event logging request without invoking said protocol specific handler if said request does not require protocol specific processing.

2. The system as claimed in claim 1 wherein said event logging request includes a protocol data unit containing protocol specific logging data, said protocol specific handler further including:

means for decoding said protocol data unit according to said particular protocol.

3. The system as claimed in claim 1 further including means for switchably inhibiting said means for invoking and said means for processing.

4. The system as claimed in claim 1 wherein said protocol specific handler is a DLL component.

5. The system as claimed in claim 1 wherein said protocol specific handler is an NLM component.

6. The system as claimed in claim 1 further including:

means for opening a data stream to a log file; and means for transferring processed logging data to said log file over said data stream.

7. The system as claimed in claim 6 further including:

means for asynchronous transfer of processed logging data to said log file, said asynchronous transfer means further including queuing means for retaining logging data for a predetermined time period; and means for delaying transfer of said logging data from said queuing means to said log file for said predetermined time period.

8. The system as claimed in claim 7 wherein said delaying means is a system callback function.

9. The system as claimed in claim 7 wherein said asynchronous transfer means further includes a means for interleaving logging data from a plurality of client components.

10. A method for protocol event logging in a computer system, said method comprising the steps of:

receiving an event logging request from a client component operating under a particular protocol;

determining if said event logging request requires protocol specific processing;

invoking a protocol specific handler corresponding to said particular protocol to process said request if said request requires protocol specific processing; and processing said event logging request without invoking said protocol specific handler if said request does not require protocol specific processing.

11. The method as claimed in claim 10 wherein said event logging request includes a protocol data unit containing protocol specific logging data, said method further including the step of:

decoding said protocol data unit according to said particular protocol.

12. The method as claimed in claim 10 further including a step of switchably inhibiting said invoking step and said processing step.

13. The method as claimed in claim 10 wherein said protocol specific handler is a DLL component.

14. The method as claimed in claim 10 wherein said protocol specific handler is an NLM component.

15. The method as claimed in claim 10 further including the steps of:

opening a data stream to a log file; and transferring processed logging data to said log file over said data stream.

16. The method as claimed in claim 15 further including the steps of:

asynchronously transferring processed logging data to said log file, said asynchronous transfer including a step of retaining logging data for a predetermined time period in an event queue; and delaying transfer of said logging data from said queue to said log file for said predetermined time period.

17. The method as claimed in claim 16 wherein said step of delaying further includes activating a system callback function.

18. A computer software system comprising:

a client component operating under a particular protocol;

a protocol specific handler for decoding said particular protocol; and a communication protocol logging component coupled to said client component and said protocol specific handler, said communication protocol logging component including:

a) an event logging interface for receiving an event logging request from said client component;

b) logic for determining if said event logging request requires protocol specific processing;

c) logic for invoking said protocol specific handler if said event logging request requires protocol specific processing; and d) logic for processing said event logging request without invoking said protocol specific handler of said request does not require protocol specific processing.

* * * * *

UNITED STATES PATENT AND TRADEMARK OFFICE
CERTIFICATE OF CORRECTION

PATENT NO. : 5,612,898
DATED : March 18, 1997
INVENTOR(S) : Jeff Huckins It is certified that error appears in the above-identified patent and that said Letters Patent is hereby corrected as shown below:

In column 5 at line 2 delete "dam" and insert --data--

In column 10 at line 45 delete "of" and insert --if--

Signed and Sealed this

Twenty-second Day of July, 1997

*Attest:*

BRUCE LEHMAN

*Attesting Officer*    *Commissioner of Patents and Trademarks*